(12) United States Patent
Battersby et al.

(10) Patent No.: US 6,672,298 B2
(45) Date of Patent: *Jan. 6, 2004

(54) METHOD FOR PROFILING PITCHES USING A COMPUTERIZED, PROGRAMMABLE PITCHING MACHINE

(75) Inventors: Gregory J. Battersby, Westport, CT (US); Michael T. Suba, Fairfield, CT (US)

(73) Assignee: ProBatter Sports, LLC, Milford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/146,432

(22) Filed: May 15, 2002

(65) Prior Publication Data

US 2003/0051718 A1 Mar. 20, 2003

Related U.S. Application Data

(63) Continuation-in-part of application No. 09/776,659, filed on Feb. 5, 2001, now Pat. No. 6,546,924, which is a continuation of application No. 09/259,722, filed on Mar. 1, 1999, now Pat. No. 6,182,649.

(51) Int. Cl.$^7$ ................................................. F41B 4/00
(52) U.S. Cl. ......................................... 124/78; 473/451
(58) Field of Search ..................... 124/6, 78; 473/451

(56) References Cited

U.S. PATENT DOCUMENTS

| | | | | |
|---|---|---|---|---|
| 4,442,823 A | * | 4/1984 | Floyd et al. ................... | 124/78 |
| 5,125,653 A | * | 6/1992 | Kovacs et al. ................. | 124/78 |
| 5,174,565 A | * | 12/1992 | Komori ..................... | 124/78 X |
| 5,359,986 A | * | 11/1994 | Magrath et al. ............... | 124/78 |
| 5,464,208 A | * | 11/1995 | Pierce ....................... | 124/78 X |
| 6,026,798 A | * | 2/2000 | Sanders et al. ................ | 124/78 |
| 6,082,350 A | * | 7/2000 | Crews et al. .................. | 124/78 |
| 6,546,924 B2 | * | 4/2003 | Battersby et al. .............. | 124/78 |

* cited by examiner

*Primary Examiner*—John A. Ricci
(74) *Attorney, Agent, or Firm*—Grimes & Battersby, LLP

(57) ABSTRACT

A method is provided for profiling pitches of an actual pitcher using a programmable pitching simulator of the type having at least two wheels and a video display component. The method comprises the steps of: (a) creating pitch profile codes for all pitches that a pitcher can reasonably pitch, the pitch profile codes including information regarding pitch type, pitch speed and pitch movement; (b) developing a master pitch parameter table for each of the pitch profile codes, the pitch parameter table including all data reasonably necessary to program the programmable pitching simulator to throw profiled pitches; (c) developing pitch profile codes for a particular pitcher, the pitch profile codes also including a code for a video image to be displayed; (d) entering into the programmable pitching simulator the specific pitch profile codes for a particular pitcher by the use of a card containing the pitch profile codes; (e) and re-programming the programmable pitching simulator to deliver pitches with the same pitch profiles of the pitcher. The method can further include developing specific sequences of particular profiled pitches to a particular batter in the sequence that the pitcher has historically pitched to the batter.

20 Claims, No Drawings

METHOD FOR PROFILING PITCHES USING A COMPUTERIZED, PROGRAMMABLE PITCHING MACHINE

RELATED APPLICATIONS

This is a continuation-in-part application of co-pending U.S. patent application Ser. No. 09/776,659, filed on Feb. 5, 2001, for Ball Throwing Machine and Method for Profiling Pitches, now U.S. Pat. No. 6,546,924; which is a continuation of U.S. patent application Ser. No. 09/259,722, filed Mar. 1, 1999, now U.S. Pat. No. 6,182,649.

FIELD OF THE INVENTION

The present invention relates generally to a method for profiling pitches using a computerized, programmable pitching machine and, more particularly, to such a method for programming a computerized pitching machine to throw pitches having the same pitch profile of actual pitchers.

DESCRIPTION OF THE PRIOR ART

Pitching machines and ball-throwing machines are well-known in the art and generally fall into four categories: (1) machines that employ a spring actuated arm mechanism to propel the ball; (2) machines that employ at least one rotating wheel or a pair of rotating, coacting wheels to propel the ball; (3) machines that rely on pneumatic pressure to propel the ball; and (4) machines that employ converging and diverging rotatable discs to propel the ball.

The marriage of a ball-throwing machine with a video display of a pitcher is described in U.S. Pat. No. 5,195,744 which issued on Mar. 23, 1993 to Neil S. Kapp et al. for Baseball Batting Practice Apparatus with Control Means. Such device, however, fails to offer the unique advantages of delivering a variety of different pitches as contemplated by the present invention. The synchronization means of such device relies upon an audio signal generated by the video, without any regard to the status of the ball in the queued position. Furthermore, the ball queuing system of this device relies on gravity and is imprecise and subject to failure.

In recent years, a number of computerized pitching machines have come onto the market which permit the user to throw a series of different pitches on an interchangeable basis. Heretofore, it was necessary to re-adjust the machine between different pitches which prevented the machine from being able to truly simulate live pitching.

The concept of programming a pitching machine to deliver a variety of different pitches has been discussed in prior patents, most notably in U.S. Pat. No. 5,125,653 which issued to Ferenc Kovacs et al. on Jun. 30, 1992 for Computer Controller Ball-throwing Machine and U.S. Pat. No. 5,464,208 which issued on Nov. 7, 1995 to Richard A. Pierce for Programmable Baseball Pitching. Such machines are of the two-wheel type and are incapable of rapid change in order to interchangeably deliver a variety of different pitches. Accordingly, the degree of programming offered by these devices is minimal, at best.

ProBatter Sports, LLC of Milford, Conn. introduced a line of pitching machines under the ProBatter trademark which can interchangeably deliver different pitches at different speeds to different locations. This line is described in U.S. Pat. No. 6,186,134 which issued on Feb. 13, 2001 to Gregory J. Battersby et al. for Pitching System with Video Display Means; U.S. Pat. No. 6,186,133 which issued on Feb. 13, 2001 to Gregory J. Battersby et al. for System and Method for Establishing Pitch Parameters in a Ball Throwing Machine; and U.S. Pat. No. 6,182,649 which issued on Feb. 6, 2001 to Gregory J. Battersby et al. for Ball Throwing Machine.

Chin Music, LLC of Seattle, Wash. has also developed a computerized pitching machine which is has licensed to Fastball Development Inc. for a product called "Abner." This technology is described more fully in U.S. Pat. No. 6,082,350 which issued on Jul. 4, 2000 for Accurate, Multi-Axis, Computer Controlled Object Projection Machine; U.S. Pat. No. 6,111,693 which issued on Aug. 29, 2000 for Projection Screen with Movable Shutter; and U.S. Pat. No. 6,347,011 which issued on Feb. 12, 2002 for Projection Screen with Movable Shutter.

Pitching machines of the ProBatter and Abner type are capable of being programmed to develop pitch profiles of actual pitchers, including Major League Baseball pitchers by separately programming the machine to deliver individual pitches.

The ability to use these machines to simulate the pitch profiles of actual pitchers is the final step in making equipment of this type true pitching simulators for hitters to better prepare for game like conditions. The creation of such pitch profiles permits a hitter to take batting practice before a game against the very pitcher that they will be facing, thereby increasing the odds of being able to hit such pitchers. The problem presented, however, is that each pitcher throws different pitches and the individual programming of the machine for each different pitcher can be complex, time-consuming and potentially beyond the limits of the computer used to control the machine. There are more than 300 pitchers in Major League Baseball and thousands more at the other levels of the game. To expect an operator to individually program these machines to simulate the pitches of each of these pitchers is a daunting task, at best.

As will be appreciated, none of these prior patents even address the problem faced by applicant let alone offer the solution proposed herein.

SUMMARY OF THE INVENTION

Against the foregoing background, it is a primary object of the present invention to provide a method for profiling pitches using a computerized pitching machine.

It is another object of the present invention to provide such a method which permits the pitching machine to be programmed to deliver pitches having a pitch profile of actual pitchers.

It is still another object of the present invention to provide such a method which can accommodate a variety of different pitchers and pitches without the need to separately program pitch parameters for individual pitchers to create a profile.

To the accomplishments of the foregoing objects and advantages, the present invention, in brief summary, comprises a method for profiling pitches of an actual pitcher using a programmable pitching simulator of the type having at least two wheels and a video display component. The method comprises the steps of: (a) creating pitch profile codes for all pitches that a pitcher can reasonably pitch, the pitch profile codes including information regarding pitch type, pitch speed and pitch movement; (b) developing a master pitch parameter table for each of the pitch profile codes, the pitch parameter table including all data reasonably necessary to program the programmable pitching simulator to throw profiled pitches; (c) developing pitch profile codes for a particular pitcher, the pitch profile codes also including a code for a video image to be displayed; (d) entering into the programmable pitching simulator the specific pitch profile codes for a particular pitcher by the use of a card containing the pitch profile codes; and (e) re-programming the programmable pitching simulator to deliver pitches with the same pitch profiles of the pitcher. The method can further include developing specific sequences of particular profiled pitches to a particular batter in the sequence that the pitcher has historically pitched to the batter.

DESCRIPTION OF THE PREFERRED EMBODIMENTS

The present invention comprises a method for creating pitch profiles of actual baseball or softball pitchers that can be delivered by a computerized pitching machine to simulate live pitching. The system was developed principally for use in conjunction with the ProBatter Professional video pitching simulator marketed by ProBatter Sports, LLC of Milford, Conn. although it can be used in conjunction with virtually any programmable baseball or softball pitching machine that is able to throw different pitches on an interchangeable basis. The ProBatter Professional system is described in greater detail in U.S. Pat. Nos. 6,182,649; 6,186,133; and 6,186,134, the disclosures of which are hereby incorporated herein by reference thereto.

Briefly stated, the ProBatter simulator includes a three-wheel, ball throwing head and a video display component including a projection screen mounted in front of the throwing head through which the ball is delivered, and a video projector. The speed of each wheel of the throwing head is individually controlled as is the horizontal and vertical orientation of the machine. By controlling individual wheel speed and throwing head location (all of which are controlled by a computer or microprocessor), the simulator is able to throw a variety of different pitches to different locations. A video image of an actual pitcher is displayed on the projection screen, the timing of which is synchronized with the actual release of the ball from the throwing head, the ball being delivered through an aperture in the projection screen.

While there are only a finite number of pitches that any pitcher can throw, e.g., fastball, curveball, slider, etc., the actual profile of each type of pitch will vary widely from pitcher to pitcher. Some pitchers may throw a true 12-6 curve ball (breaking directly in a downward direction or from the 12 o'clock direction to the 6 o'clock direction) while others may throw what is referred to as a "slurve" or a 2-8 curve. Similarly, the objective of all pitchers is to have some movement, or deviation from the initial flight path, on each and every pitch. Obviously, the amount of movement will vary from pitcher to pitcher. For example, some pitchers throw a fastball with a 2" upward movement while others may have a 6" upward movement. Similarly, some pitchers may throw a relatively straight changeup while the changeup of others may break down and in towards the batter. The amount of movement of these pitches will serve to define the pitch profile of a particular pitcher.

Similarly, pitchers will throw pitches at different speeds. Some Major League pitchers throw rising fastballs in the mid-90's (MPH) while others may throw in the 80's (MPH).

It will be appreciated that every pitcher has a unique "pitch profile" of the pitches that he or she throws. This pitch profile will include type of pitch, speed of the pitch and movement of the pitch. As noted above, the programmable nature of a computerized pitching machine permits user to control such pitch profile by pre-programming the computerized machine to match the profile of a particular pitcher.

Pitching simulators such as the ProBatter Professional simulator may also include a video component where the image of an actual pitcher is displayed in synchronization with the release of the ball. With such simulators, it is also possible to change to video image to conform to a particular pitcher. A generic image can be used or, in a preferred embodiment, a video image of the actual pitcher for whom the profile is created can be selected. Even with generic images, one can vary the video image to select right handed and left handed pitchers as well as pitchers delivering from a full windup or a stretch. Similarly, the style and timing of a particular motion can be varied to more closely simulate a particular pitcher.

Each pitch delivered by a computerized pitching machine is controlled by a set of parameters, i.e., individual wheel speed and the position or orientation of the machine. If the pitching simulator includes a video component, one would also have to control the video image. The manner in which pitch parameters are controlled is described in greater detail in the three earlier ProBatter patents referenced above, the disclosure of which is incorporated herein by reference thereto. In the case of a two wheel machine such as the one described in the Chin Music patents, pitch parameters may also be dependent upon the orientation of the two wheels, i.e., in order to throw a breaking pitch with a two wheel machine, it might be necessary to move the alignment of the wheels from the purely vertical position commonly used for a fastball.

As previously noted, if one were to attempt to develop pitch profiles for every Major League Baseball pitcher on an individual basis, one would need to create a separate program for each pitcher and for each pitch that they threw. Thus, for each pitch thrown by a particular pitcher with a three-wheel machine, the user would have to develop wheel speed settings, pitch head orientation and video image to be displayed. This would, presumably, have to be done for all speeds and at all locations. For a two-wheel machine, an additional parameter of wheel orientation would also have to be inputted.

As one can appreciate, with more than 300 Major League pitchers and many more in other levels of professional and collegiate baseball, separately programming the machine with each of these pitch parameters for each pitcher could be a logistical nightmare.

The method of profiling contemplated by this invention requires the development and employment of a master data base of all possible pitches that a pitcher could possibly throw and then grading each pitch based on the extent of the break or movement of the pitch. For example, as described previously, there are a number of different types of curve balls that can be thrown depending upon the angle of the pitch, e.g., 12-6 or 2-8, and the degree of break, e.g., 2 inches in a horizontal direction or 8 inches in a vertical direction. A curve ball that breaks directly down is typically referred to as a 12-6 curve balls while a pitch that might have more of an outward and downward break is referred to as a 2-8 curve or a "slurve." Obviously, there will be a difference between right handed and left handed pitchers.

In creating this master data base, it is necessary to "grade" each type of pitch depending upon the extent of the break. The following Master Pitch Table (Table A) is an example of such a Master Pitch Table that can be used for most common pitches:

TABLE A

MASTER PITCH TABLE

| Pitch | | 1 | 2 | 3 | 4 | 5 |
|---|---|---|---|---|---|---|
| RH Pitcher | | | | | | |
| A | Rising FB | Straight | 1" | 2" | 3" | 4" |
| B | Sinker | 2" | 4" | 6" | 8" | 10" |
| C | Splitter | 6" | 8" | 10" | 12" | 14" |
| D | Cutter-to Left | 2" | 4" | 6" | 8" | 10" |
| E | 12-6 Curve | 6" | 9" | 12" | 15" | 18" |
| F | 1-7 Curve | 6" | 8" | 10" | 12" | 15" |
| G | 2-8 Curve | 6" | 8" | 10" | 12" | 15" |
| H | Changeup-to Right | 0" | 2" | 4" | 6" | 8" |
| I | Slider-2" Down | 2" | 4" | 6" | 8" | 10" |
| J | Slider-4" Down | 2" | 4" | 6" | 8" | 10" |
| K | Slider-6" Down | 2" | 4" | 6" | 8" | 10" |
| L | Slider-8" Down | 2" | 4" | 6" | 8" | 10" |
| M | Screwball-2" Down | 2" | 4" | 6" | 8" | 10" |
| N | Screwball-4" Down | 2" | 4" | 6" | 8" | 10" |
| O | Screwball-6" Down | 2" | 4" | 6" | 8" | 10" |
| P | Screwball-8" Down | 2" | 4" | 6" | 8" | 10" |
| Q | Sidearm Fastball | 0" | 2" | 4" | 6" | 8" |
| LH Pitcher | | | | | | |
| AA | Rising FB | Straight | 1" | 2" | 3" | 4" |
| AB | Sinker | 2" | 4" | 6" | 8" | 10" |
| AC | Splitter | 6" | 8" | 10" | 12" | 14" |
| AD | Cutter-to Right | 2" | 4" | 6" | 8" | 10" |
| AE | 12-6 Curve | 6" | 9" | 12" | 15" | 18" |
| AF | 11-5 Curve | 6" | 8" | 10" | 12" | 15" |
| AG | 10-4 Curve | 6" | 8" | 10" | 12" | 15" |
| AH | Changeup-to Left | 0" | 2" | 4" | 6" | 8" |
| AI | Slider-2" Down | 2" | 4" | 6" | 8" | 10" |
| AJ | Slider-4" Down | 2" | 4" | 6" | 8" | 10" |
| AK | Slider-6" Down | 2" | 4" | 6" | 8" | 10" |
| AL | Slider-8" Down | 2" | 4" | 6" | 8" | 10" |
| AM | Screwball-2" Down | 2" | 4" | 6" | 8" | 10" |
| AN | Screwball-4" Down | 2" | 4" | 6" | 8" | 10" |
| AO | Screwball-6" Down | 2" | 4" | 6" | 8" | 10" |
| AP | Screwball-8" Down | 2" | 4" | 6" | 8" | 10" |
| AQ | Sidearm Fastball | 0" | 2" | 4" | 6" | 8" |

Using the above Master Pitch Table, a "Pitch Profile Code" is created for each different type of pitch categorized by pitch type, break and speed. Thus, the Pitch Profile Code for a 76 MPH, 2-8 curve ball from a right handed pitcher that drops 10" is G3-76 while the Pitch Profile Code for a lefthander's sinker at 88 MPH that drops 4" would is AB2-88.

The Pitch Profile Code can also include pitch location based on position both within and outside the strike zone. For purposes of determining location, the strike zone is divided into five zones with four locations outside the strike zone, each zone being identified by a number, as illustrated in the following Table:

TABLE B

STRIKE ZONE

```
          6
      ┌───┬───┐
   2  │   │ 3 │
      │   │   │
   7  │   │ 1 │ 9
      │   │   │
      ├───┼───┤
   4  │   │ 5 │
      └───┴───┘
          8
```

Thus, if pitch location is included in the Pitch Profile Code, the above described 76 MPH 12-6 curve ball that breaks 10" in a downward direction delivered down and out to a right hand batter (zone 4) would be referred to as E3-76-4. Similarly, the Pitch Profile Code for the above described lefthander's sinker at 88 MPH that drops 4" thrown down and in (zone 5) and to right hand hitter would is AB2-88-5.

In a video pitching simulator with multiple video images (preferably stored as MPEG or AVI files on the hard drive), the Pitch Profile Code could also include an identification of the video image that can be played. Video images are separately identified by a combination of letter and number codes, e.g., LHPWF1 for left handed pitcher ("LHP"), windup ("W") and fastball motion ("F1"). The first three letters identify the particular pitcher, LHC could for a generic left handed college pitcher or RHL for a generic right handed Little League pitcher. The fourth letter identifies the type of motion, e.g., "W" for full windup and "S" for a stretch position. Finally, the last two letters identify the type of pitch being thrown, e.g., "F1"for a full speed fastball or "CB" for a curve ball.

For specific pitchers, their initials or other designation could take the place of the type of pitcher and be included as the first three letters. Thus, John L. Sullivan could be JLSWCB for the image of John L. Sullivan throwing a curve ball from a full windup. Hence the Pitch Profile Code for Sullivan throwing from a full windup a 76 MPH 12-6 curve ball that breaks 10" in a downward direction delivered down and out to a right hand batter (zone 4) would be referred to as G3-76-4-JLSWCB. Similarly, the pitch code for a generic left hand pitcher throwing from a stretch position a sinker at 88 MPH that drops 4" thrown down and in (zone 5) and to right hand hitter would is AB2-88-5-LHPSF2.

This Pitch Profile Code is used for the purpose of programming the computerized, programmable pitching machine to throw the pitch profile of a particular pitcher. It will be appreciated that programmable simulators can be programmed to deliver the pitches identified in Table A in order to throw a particular pitch at a particular speed to the particular location in Table B.

Using a three-wheel simulator, the following parameters need to be controlled to deliver a particular pitch at a particular speed to a particular location: the speed of each wheel; the horizontal position or orientation of the throwing head; and the vertical position or orientation of the throwing head. If video is included, it is necessary to identify the video clip that is to be run. These parameters have been established by random testing. Since the relationship between wheel speeds and actuators has been found to be generally linear, it is possible to create a formula for determining wheel speeds for different pitch speeds and different locations using a MathCAD program after a number of overall settings are established. This, of course, facilitates rapid adjustment of pitch speed and location. The use of such a MathCAD program is described in greater detail in U.S. Pat. No. 6,186,133.

Tables C and D depict typical defined parameters for a particular pitch at a particular speed to a particular location with a particular video image:

TABLE C

PARAMETERS FOR A CURVE BALL

| Pitch | MPH | Location | Wheel A | Wheel B | Wheel C | Vertical | Horiz. | Video Image |
|---|---|---|---|---|---|---|---|---|
| E4-76-1 | 76 | Center | 1850 | 1850 | 1200 | 22 | 45 | RHPWCB |

In contrast, the parameters for a different pitch might be as follows:

TABLE D

PARAMETERS FOR A FASTBALL

| Pitch | MPH | Locat. | Wheel A Speed | Wheel B Speed | Wheel C Speed | Vert. | Hor. | Video Image |
|---|---|---|---|---|---|---|---|---|
| A5-92-1 | 92 | Center | 1600 | 1600 | 1850 | 17 | 32 | RHPWFB |

The above parameters are required for every pitch that the programmable pitching machine can deliver.

Once the master database of Table A is established, a Master Parameter Table is created (using the format of Tables C and D) for all such pitches. The Master Parameter Table is then linked to the Master Pitch Table such that every pitch contained in the Master Pitch Table has a companion entry in the Master Parameter Table identifying the appropriate wheel speeds, horizontal and vertical position or orientation of the pitching machine and, in a video machine, the video image to be used.

Once the Master Pitch Table of Table A and the Master Parameter Table (see Tables C and D) are created, the method of the present invention contemplates a scout actually observing the actual pitches thrown by a particular pitcher and creating a "profile" for each pitcher using the criteria of the Master Pitch Table of Table A. This can be done in person at a game or practice, or by observing game videos. This task is often made much easier by the fact that certain ballparks or networks actually display the pitch speed and type on a display. The data can be captured on paper or, alternatively, onto a computer in a database program or on a PDA. For example, the scout might determine that the pitch profile for John L. Sullivan, a right hand pitcher, is as follows:

| Pitch | Speed | Typical Location | Pitch Profile Code |
|---|---|---|---|
| Fastball (Straight) | 92 | Center | A1-92-1 |
| 12-6 Curveball (18" Drop) | 78 | Down & Out | E5-78-4 |
| Slider (4" down; 8" across) | 84 | Up and Out | J4-84-2 |
| Changeup (2") | 80 | Down & In | H2-80-5 |

The scout would further select the applicable image that best fits the pitcher, e.g., overhand delivery with slow windup or, possibly, a video of the actual pitcher for each pitch.

Armed with this information, it is possible to create a profile for a particular pitcher by simply programming the computer controlled pitching machine using the Pitch Profile Codes for each pitch in the pitcher's repertoire. In the video mode, the Pitch Profile Code would also include the legend for the appropriate video to be used, e.g., A1-92-1-JLSWFB for the fastball, etc. Note that in this example, a specific video of John L. Sullivan was used. The Pitch Profile Code for a generic right hand pitcher video would be: A1-92-1-RHPWFB. If it was appropriate to use a video of the pitcher from a stretch position, the code would be A1-92-1-RHPSFB.

As noted earlier, the images used can be video images of the actual pitcher or, alternatively, video images of generic pitchers. They can also be computer generated images of actual pitchers which would permit computer modifications and manipulations.

The computer controlled pitching machine can be programmed for the particular pitcher profile in a number of different ways. The Master Pitch Table and the Master Parameter Table are both stored on the computer hard drive. It will be appreciated that either or both can be periodically updated or changed if necessary. The Pitch Profile Codes for a particular pitcher derived from the scouting data can be manually entered into the computer through a keyboard or touch screen controller. Alternatively, they can be stored on the computer hard drive and accessed through either the keyboard, mouse or touch screen.

In a preferred embodiment, the Pitch Profile Codes for a particular pitcher or team can be stored on a card with a bar code or on a Smart Card identifying the specific pitch repertoire of the pitcher and his or her Pitch Profile Codes. The cards would interface with a bar code reader or Smart Card reader for the computerized pitching machine and permit instant re-programming of the computerized pitching machine to match the pitch profile of the particular pitcher.

Once the particular Pitch Profile Codes are entered into the computer of the pitching machine, the Pitch Profile Codes would be linked to the Master Parameter Table to determine the specific parameters for the particular pitch, and the simulator could deliver the pitches in the sequence established by the card.

The advantages of such a system are obvious. Bar code cards or Smart Cards for individual pitchers can be created in a particular pitch sequence selected by the operator or scout. In this manner, the simulator can be instantly re-programmed to deliver the pitch profile (with or without video) of a particular pitcher by simply swiping the card past the card reader. Pitch profiles or pitch sequences can be easily changed by changing the pitch profiles on the card. A team can-stock cards for each of the opposing team's pitchers and prepare for the pitcher or pitchers they will next face by reprogramming the simulator with the swipe of a card.

This method also includes a component in which particular pitch sequences for a particular batter can be established based on scouting reports of a pitcher against a particular hitter. For example, scouting data might establish that a particular pitcher has historically pitched a particular hitter in a particular manner, e.g., high fastball up and in followed by a series of slow curveballs down and out. Using this data and the pitch profiles for a particular pitcher, a particular sequence can be established for a particular hitter against a particular pitcher. The computerized pitching machine can be pre-programmed to throw not only the pitch profile of a particular pitcher, but in the same sequence that the pitcher has historically pitched to a particular hitter. These sequences can be entered manually or, in a preferred embodiment, stored as a bar code on a bar code card or on a Smart Card which would serve to program the machine to deliver the same pitch profile of the particular pitcher to a particular hitter in a particular sequence. For example, the card could program the machine as follows to deliver the following pitches which are based on the historical scouting data for that pitcher against that hitter:

| Pitch Number & Type | Speed | Location | Video | Pitch Profile Code |
|---|---|---|---|---|
| 1 Fast Ball Up & In | 92 | 2 | 2 | A1-92-2-JLSWFB |
| 2 Curve Ball Down & Out | 76 | 4 | 4 | E3-76-4-JLSWCB |
| 3 Curve Ball Down & Out | 76 | 4 | 4 | E3-76-4-JLSWCB |
| 4 Changeup Down & In | 78 | 3 | 3 | H3-78-3-JLSWCU |
| 5 Fastball Up & In | 92 | 2 | 2 | A1-92-2-JLSWFB |
| 6 Curve Ball Down & Out | 76 | 4 | 4 | E3-76-4-JLSWCB |
| 7 Fastball Up & In | 92 | 2 | 2 | Al-92-2-JLSWFB |
| 8 Curve Ball Down & Out | 76 | 4 | 4 | E3-76-4-JLSWCB |
| 9 Fastball Up and In | 92 | 2 | 2 | Al-92-2-JLSWFB |
| 10 Slider Down and In | 82 | 3 | 3 | I1-82-3-JLSWSL |

The obvious advantage of such a system is that it permits a hitter to take batting practice against the exact pitch profile of a particular pitcher thrown in the same sequence that the pitcher has historically pitched the hitter.

Having thus described the invention with particular reference to the preferred forms thereof, it will be obvious that various changes and modifications can be made therein without departing from the spirit and scope of the present invention as defined by the appended claims.

What is claimed is:

1. A method for simulating the actual pitches thrown by a live pitcher using a programmable pitching simulator, said method comprising the steps of:

developing a pitch profile for said pitcher, said profile including the types of pitches thrown by said pitcher, the speeds at which said pitches are thrown and the actual movement of all such pitches;

programming said simulator to throw said pitches; and pitching said profiled pitches.

2. The method of claim 1, wherein said simulator is programmed using a card containing a bar code.

3. The method of claim 1, wherein said simulator is programmed using a Smart Card.

4. The method of claim 1, wherein said simulator includes a video component for displaying the moving image of a pitcher.

5. The method of claim 4, wherein said pitch profile further includes the display of a video image of said pitcher, the display of which is synchronized with the release of the pitch from said simulator.

6. A method for simulating the actual pitches thrown by a live pitcher using a programmable pitching simulator, said method comprising the steps of:

developing a pitch profile for said pitcher, said profile including the types of pitches thrown by said pitcher and the speeds at which said pitches are thrown;

programming said simulator to throw said pitches using a card, said card selected from the group consisting of bar code cards and Smart Cards; and pitching said profiled pitches.

7. A method for profiling pitches of an actual pitcher using a programmable pitching simulator, said method comprising the steps of:

creating pitch profile codes for all pitches that said pitcher can reasonably pitch, said pitch profile codes including information regarding pitch type and pitch speed;

developing a master pitch parameter table for each of the pitch profile codes, said pitch parameter table including all data reasonably necessary to program said programmable pitching simulator to throw said pitches;

developing pitch profile codes for a particular pitcher;

entering into the programmable pitching simulator the specific pitch profile codes for a particular pitcher; and re-programming said programmable pitching simulator to deliver pitches with the same pitch profiles of said pitcher.

8. The method of claim 7, wherein said pitch profile codes further include information concerning pitch movement.

9. The method of claim 7, wherein said pitching simulator further includes a video display component and wherein said pitch profile codes further include information concerning an video image corresponding to said specific pitch profile to display.

10. The method of claim 7, wherein said programmable pitching simulator includes at least two wheels and is capable of moving in both a horizontal and vertical direction, and wherein said master pitch parameter table includes data concerning the appropriate speed for each of said at least two wheels and the appropriate horizontal and vertical position for the simulator when throwing a particular pitch at a particular speed to a particular location.

11. The method of claim 7, wherein said simulator includes a video component and further wherein said master pitch parameter table includes an identification of the appropriate video to display.

12. The method of claim 7, wherein said pitch profile codes are entered into said simulator by use of a card containing a bar code.

13. The method of claim 7, wherein said pitch profile codes are entered into said simulator by use of a Smart Card.

14. A method for profiling pitches of an actual pitcher using a programmable pitching simulator of the type having at least two wheels and a video display component, said method comprising the steps of:

creating pitch profile codes for all pitches that a pitcher can reasonably pitch, said pitch profile codes including information regarding pitch type, pitch speed and pitch movement;

developing a master pitch parameter table for each of the pitch profile codes, said pitch parameter table including all data reasonably necessary to program said programmable pitching simulator to throw said pitches;

developing pitch profile codes for a particular pitcher, said pitch profile codes also including a code for a video image to be displayed; and entering into the programmable pitching simulator the specific pitch profile codes for a particular pitcher by the use of a card containing said pitch profile codes; and re-programming said programmable pitching simulator to deliver pitches with the same pitch profiles of said pitcher.

15. The method of claim 14, wherein said cards are selected from the group consisting of cards having bar codes and Smart Cards.

16. A method for simulating the actual pitches thrown by a live pitcher to a particular hitter in the sequence that said pitch has historically pitched to said hitter using a programmable pitching simulator, said method comprising the steps of:

developing a pitch profile for said pitcher, said profile including the types of pitches thrown by said pitcher and the speeds at which said pitches are thrown;

developing a pitch sequence that said pitcher has historically pitched to said hitter;

programming said simulator to throw said pitches in the sequence that said pitcher has historically pitched to said hitter; and pitching said profiled pitches toward said batter in said sequence.

17. The method of claim 16, wherein said pitch profile further includes data concerning the actual movement of all such pitches.

18. The method of claim 16, wherein said simulator is programmed using either a bar code card or a Smart Card.

19. A method for simulating the actual pitches thrown by a live pitcher using a programmable pitching simulator, said method comprising the steps of:

developing a pitch profile for said pitcher, said profile including the type of pitches thrown by said pitcher and the speeds at which said pitches are thrown;

programming said simulator to throw said pitches; and pitching said profiled pitches using said simulator.

20. The method of claim 19, wherein said simulator includes a video display for displaying the image of an actual pitcher, said video display being synchronized with the pitching of said profiled pitches.

* * * * *